Oct. 11, 1927.
V. E. ANKARLO
1,644,974
CONNECTING ROD BEARING
Filed July 5, 1924 4 Sheets-Sheet 1
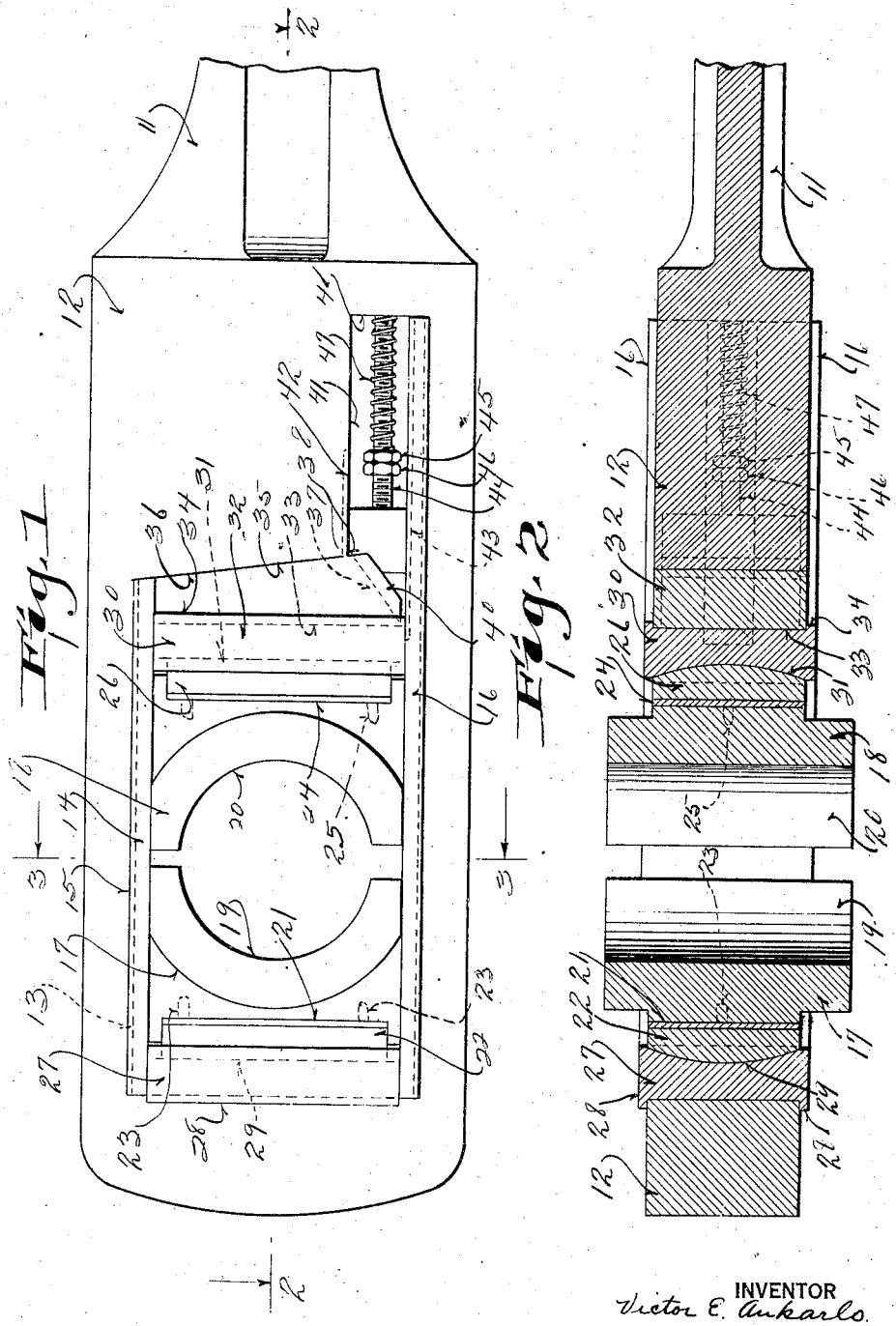
INVENTOR
Victor E. Ankarlo.
BY
Erwin, Wheeler & Woolard
ATTORNEYS Oct. 11, 1927.
V. E. ANKARLO
1,644,974
CONNECTING ROD BEARING
Filed July 5, 1924      4 Sheets-Sheet 2
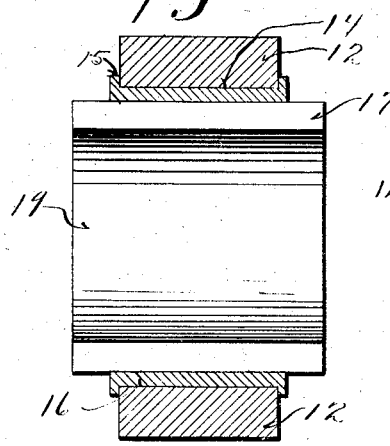
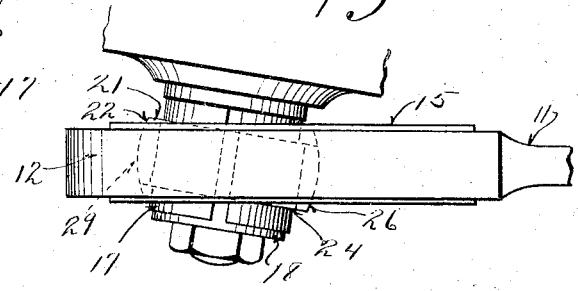
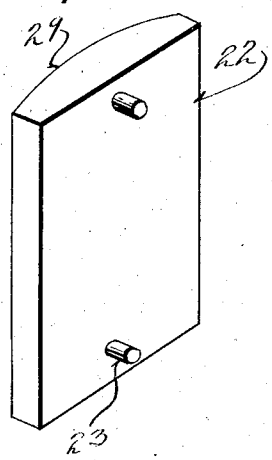
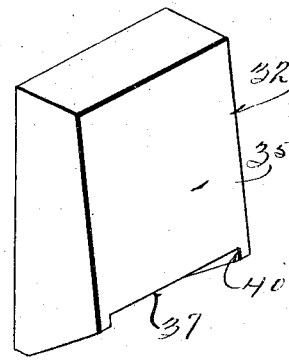
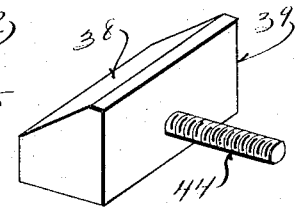
INVENTOR
Victor E. Ankarlo
BY
Erwin, Wheeler & Woolard
ATTORNEYS.

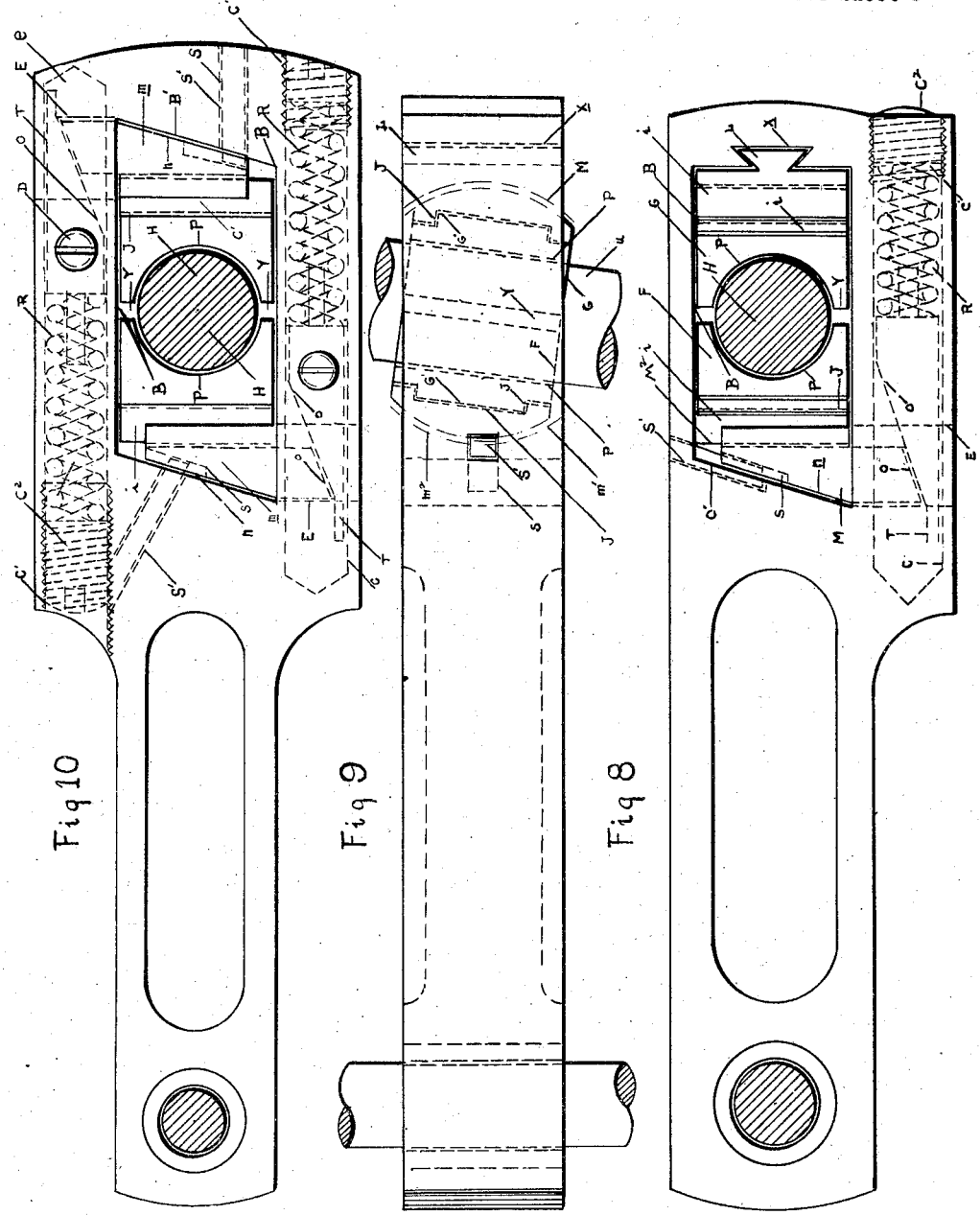

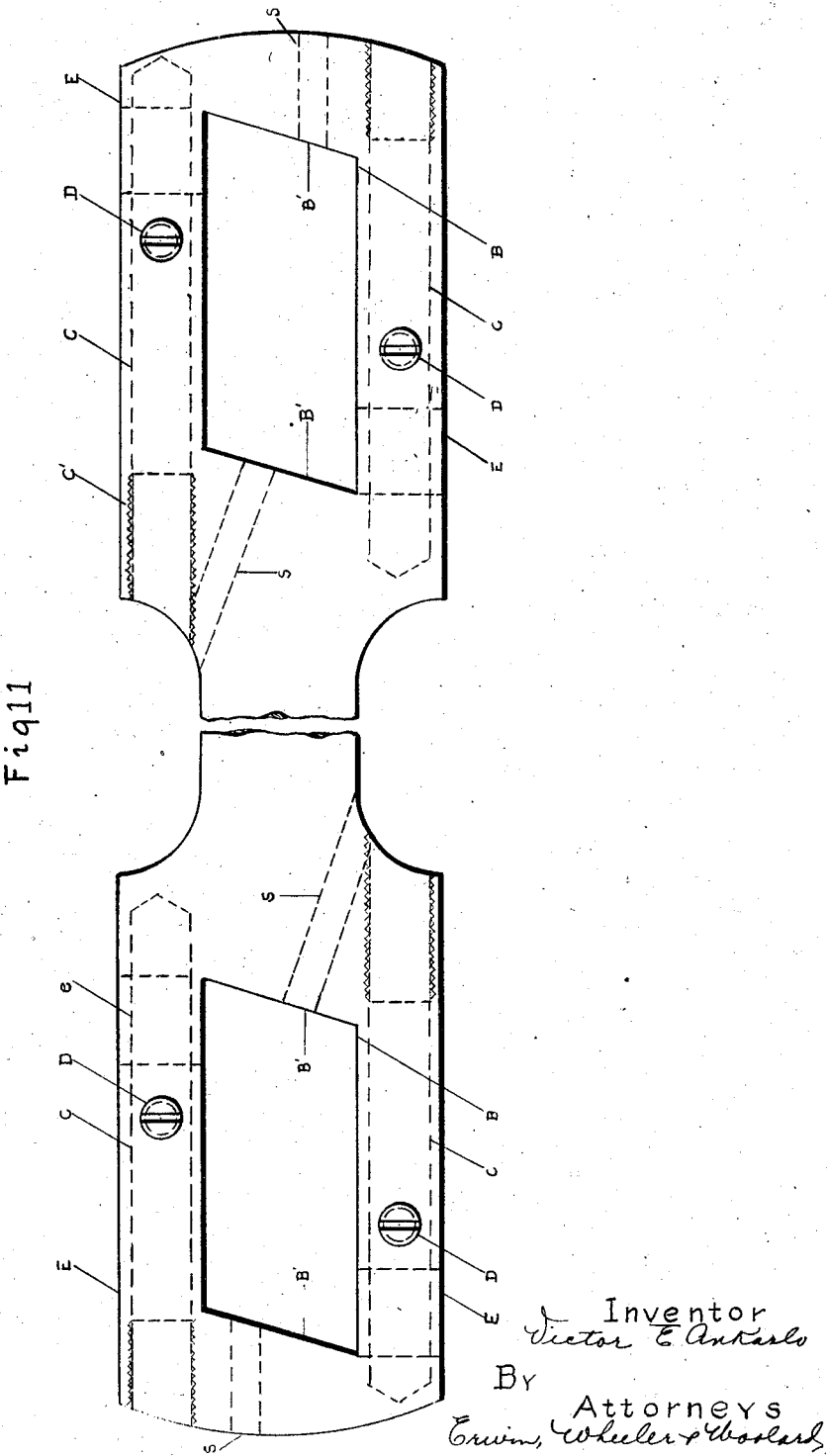

Patented Oct. 11, 1927.

1,644,974

UNITED STATES PATENT OFFICE.

VICTOR E. ANKARLO, OF DULUTH, MINNESOTA, ASSIGNOR OF FIVE PER CENT TO THEODORE J. SAED, OF SUPERIOR, WISCONSIN; FIVE PER CENT TO JOEL O. BODIN, OF DULUTH, MINNESOTA; AND FIVE PER CENT TO G. M. SCHUCHT, OF MILWAUKEE, WISCONSIN.

CONNECTING-ROD BEARING.

Application filed July 5, 1924. Serial No. 724,546.

This invention relates to a new and improved side rod connection for locomotives and more specifically to a connection of this character adapted to permit lateral swing of the side rod or angular displacement between the side rod and driving wheels. In locomotives, the connection between the side rod and the drive wheels is subject to considerable wear and torsional stress due to inequalities or curvature of the track with consequent relative displacement and strain upon the members.

It is an object of the present invention to provide a connection between the side rod and crank-pin, such as to permit relative angular displacement between the parts without strain or unequal wear upon the parts and contacting surfaces.

It is a further object to provide a connection of this character which is adapted to automatically take up wear as the wear occurs and which is adapted to be adjusted to compensate for excessive amounts of wear.

It is also an object to provide a construction which is simple in design, composed of but few parts and which may be readily applied to existing installations without material change therein.

Other and further objects will appear as the description proceeds.

I have illustrated a preferred embodiment of my invention in the accompanying drawings, in which—

Figure 1 is a side elevation of the connection constructed according to the present invention;

Figure 2 is a horizontal section taken on line 2—2 of Figure 1;

Figure 3 is a vertical section taken on line 3—3 of Figure 1;

Figure 4 is a perspective view of one of the bearing blocks;

Figure 5 is a perspective view of the wedge key;

Figure 6 is a perspective view of the wedge block; and

Figure 7 is a plan view on a reduced scale showing the parts angularly displaced, the displacement being exaggerated for the sake of clearness.

Figure 8 is a side view of a slightly modified form,

Figure 9 is a plan view of the same.

Figure 10 is a side view of a further modified form,

Figure 11 is a side view of a double connecting rod indicating another arrangement of the parts, The side rod 11 is provided with the large connecting end 12 which latter has formed therein the slot 13. The hardened steel liner 14 is fitted against the upper face of the slot, the liner being provided with the flanges 15 which engage the front and rear faces of the connecting rod end and prevent lateral displacement of the liner. The lower face of the slot is provided with a similar liner 16. The brasses 17 and 18 are fitted between the liners 14 and 16 and are provided with the semi-circular bearing faces 19 and 20 adapted to engage a crank-pin. As shown in Figure 2 the shim 21 is fitted against that face of the brass 17 opposite to its bearing face.

The block 22 is fitted upon the outer face of the shim 21 and is provided with the dowel pins 23 which pass through openings in the shim and enter recesses in the brass. The shim 24 is similarly located upon the opposite face of the brass 18 and is retained in place by the dowel pins 25 extending from the block 26. The saddle 27 is fitted into the end of the slot in the side rod end and is provided with the flanges 28 overhanging the front and rear faces of the rod and with the concave surface 29 which engages the convex surface of the block 22. The saddle 30 is provided with the concave surface 31 engaging the convex surface of the block 26.

The wedge key 32 engages the face 33 of the saddle 30 being retained against lateral displacement by the flanges 34 spaced apart to provide a guide-way for the wedge key 32. This wedge key 32 is provided with a wedge face 35 engaging the wedge face 36 formed in the end of the side rod slot 13. The lower face 37 of the wedge key 32 is engaged by the wedge surface 38 of the wedge block 39. This block 39 is retained between flanges 40 formed upon the wedge key 32. The wedge block fits in the extension 41 of the slot 13 and is fitted within flanges 42 formed on the side rod end and the flanges 43 formed on the liner 16. The block 39 is provided with the threaded extension 44 which carries the nut 45 and lock nut 46. The spring 47 surrounds the threaded portion 44 and is held between the nut 45 and the end wall 48 of the extended portion 41 of the slot.

In the operation of the connection when the parts are angularly displaced, as shown in Figure 7, the brasses 17 and 18, the shims 21 and 24 and the blocks 22 and 26 swing with the crank pin. The surfaces of the brasses thus move relative to the liners 14 and 16. Also the arcuate surfaces of the blocks 22 and 26 move relative to the coacting surfaces of the saddles 27 and 30. These saddles 27 and 30 together with the wedge key 32 and wedge block 39 remain in fixed relation to the side rod. It will be seen that this relative movement occurs between surfaces shaped to permit it without strain or torsional strain upon any of the parts.

As wear occurs, either upon the bearing faces 19 and 20 of the brasses or upon the coacting faces of the blocks and saddles, the wedge key 32 will move up under thrust from the wedge block 39 which thrust is caused by the spring 47. The parts will thus be maintained at all times in intimate engagement.

The angle which the plane of the surface 35 of the wedge key and surface 36 of the side rod makes with the line of thrust transmitted from the crank pin is such as to prevent any downward displacement of the wedge key 32 under this thrust. Further, the angle which the plane of the contacting surface 37 of the wedge key and 38 of the wedge block makes with relation to the thrust transmitted by the spring 47 is such as to permit this thrust to readily raise the wedge key 32 to maintain it in proper contact with the adjacent parts. By means of the nut 45 and lock nut 46 the spring 47 may be adjusted to give the thrust necessary under the circumstances.

While shims have been shown at 21 and 24 it will be understood that when initially installed, the parts may be of such size and relation that no shims are necessary. When, however, such wear has taken place that the upper face of the wedge key 32 approaches the liner 14, the parts may be removed and shims inserted in the points shown. When further wear occurs, these shims may be removed and shims of greater thickness put in their place.

It will be seen, therefore, that the present construction not only automatically takes up small amounts of wear as the wear occurs, but is also capable of being adjusted to take up large quantities of wear. The construction is simple and composed of but few parts and may be readily applied to existing installations to provide adequate flexibility in a side rod connection.

In the form illustrated in Figures 8 and 9, which show another embodiment of the same inventive idea involved, I show a connecting rod for an engine or any machine with a single automatic bearing device, the slot B has an inclined or wedge shaped end wall B', and a pair of brasses F and G which are fitted in said slot to engage a pin or shaft H.

In the slot B are also fitted a pair of saddles $i$ having convex cylindric surfaces $M^2$ and a channel J. A wedge key block M is also fitted in said slot, the key block being provided with a wedge face $o$ on its end, lower key block M having a key way S on face $n$ to receive a key $s'$ in the rod (see Figs. 8, 9 and 10).

Slot B in the side rod shown in Figs. 8 and 9 is provided with a key way $x$ to receive die-plate L which is thus fitted tightly in slot B and in key way $x$, and is also provided with concave cylindric surfaces to receive the convex cylindric surface or face of saddle $i$.

The guide hole E and key S' (Figs. 8, 9, 10 and 11) protect key blocks $m$ and cause them to stay in fixed relation with said rods.

At C is shown a hole or passage bored in the side rod in which is carried a wedge T having thereon an inclined or wedge face $o$ which is formed to fit wedge face $o$ on key block $m$ in Figs. 8, 9 and 10.

As shown in Figure 8, H represents a shaft while U in Fig. 9 is a pin. P. P. indicate cylindric surfaces on brasses F and G in Fig. 9, and Y indicates the space between opposing ends of the brasses F and G in Fig. 9.

In Fig. 10 is shown a side elevation of a connecting rod provided with a double set of automatic ports to render it more efficient to take up wear and to permit greater adjustment between centers. This connecting rod is provided with a slot B wherein is formed a pair of wedge face end walls B' inclined in same direction, but reversely positioned, and a pair of key blocks $m$ are fitted to such wedge face end walls B' within the slot.

In this rod shown in Fig. 10, a pair of saddles $i$ are fitted and adapted to receive key blocks $m$, and also to fit brasses F and G; key blocks $m$ have concave cylindric surfaces to receive the convex cylindric surfaces of saddle $i$, and said saddle is provided with a channel J, as shown in Fig. 9 to receive ribs G' projecting from brasses F and G; all of these to fit in the slot B in the end of the side rod.

The rod shown in Figure 10 has two holes or passages bored therein wherein wedge blocks T are fitted, said blocks having inclined or wedge faces to cooperate with the wedge faces $o$ of key blocks $m$, as in Figs. 8 and 10. In the holes or passages C which extend in opposite directions, springs R are placed one end bearing against the wedge blocks T, the butt ends of which are provided with tenons over which said springs extend.

The outer end portions of the passages C are internally threaded as at C' into which threaded portion the set screws C² are screwed forming abutments for the outer ends of springs R, and by which they are adjusted.

In raising or lowering key blocks m by means of wedge blocks T, springs R and set screws C², the center between pins will be easily found. This form also eliminates shims.

The side rod illustrated in Fig. 10, also carries the lateral set or binding screws D adapted to cooperate with the wedge blocks T; thus by setting the lower screw D tight against the lower wedge block T this block and the associated spring R, key block m, saddle i and brass F will become stationary on that particular side. The reverse of this situation will result from the tightening of the upper lateral set screw D. By setting both screws D tight against both wedge blocks T, at the same time, then both sides of the assembly will become stationary.

By releasing one set screw from its wedge block, this block and its associated spring, key block, saddle and brass will work automatically on that particular side. By releasing both set screws D from their wedge blocks, then both sides will work automatically.

In Figure 11 is illustrated a side rod in which both ends are made alike, that is, provided with the elongated slots B having inclined end walls B' and bored holes or passages C parallel to said slot, the outer ends of said passages being threaded as at C' to receive the set screws or plugs C² as hereinbefore mentioned. The set screws D are also indicated in this figure; E indicates the respective guideways and S are keyways to receive the keys S'.

From the above description, it will be readily understood that I provide a side rod and connection which presents the advantages of permitting the required degree of free swivelling movement in a horizontal plane without involving complicated or expensive structure, or liability to cramping in operation, and one which is capable of automatic and accurate adjustments to compensate for wear.

While I have herein shown several embodiments of my invention, it is to be understood that I contemplate such other changes and modifications as come within the spirit and scope of the appended claims.

I claim:

1. A connecting rod for engines having a slot in its end, a pair of crank pin brasses fitted in said slot and adapted to engage a crank pin, blocks fitted in said slot adapted to fit said brasses, said blocks having convex cylindric outer surfaces, saddles fitted in said slot and coacting with said blocks, said saddles having complemental concave cylindric inner surfaces to receive the convex surfaces of the aforesaid blocks.

2. A connecting rod for engines, having a slot in its end, a pair of crank pin brasses adapted to engage a crank pin, and fitted in said slot, blocks fitted in said slot and adapted to cooperate with said brasses, said blocks having convex cylindric outer surfaces, saddles fitted in said slot, the inner surfaces of said saddles being complemental concave cylindric to receive the convex surface of the blocks, and resiliently urged sliding wedge means adapted to force the saddles into engagement with the blocks.

3. A connecting rod having a slot in one end, a pair of crank pin brasses adapted to engage a crank pin and fitted in said slot, blocks fitted to said brasses and within the slot, said blocks each having a convex cylindric outer surface, saddles fitted in said slot and each having a complemental concave cylindric inner surface to receive the convex surface of one of said blocks, one of the saddles being provided with a guideway opposed to the concave surface and said slot having an inclined end wall, a wedge key within said slot and engaging the inclined wall and guideway, and resilient means engaging said key in such manner whereby to force one of the blocks toward an adjacent brass.

4. A connecting rod having a slot in one end, a pair of brasses fitted in said slot and adapted to engage a crank pin, blocks fitted to said brasses and each having a convex cylindric outer surface, saddles mounted in said slot each having a concave cylindric surface to receive one of said blocks, one of the saddles being provided with a guideway opposed to the concave surface and said slot having an oblique end wall, a wedge key engaging the guideway and oblique wall, and a spring pressed wedge block engaging the wedge key in such manner whereby to move the wedge key to force one of said blocks toward an adjacent brass.

5. A connecting rod for locomotives and having a slot in its end, a pair of brasses adapted to engage a crank pin and fitted in said slot, blocks having dowel pins projecting therefrom and secured to the outer faces of said brasses by said dowel pins, said blocks having convex cylindric surfaces, saddles fitted in said slot and having complemental concave cylindric surfaces adapted to receive the said convex surfaces of the blocks.

6. A connecting rod for locomotives and having a slot in its end, a pair of brasses fitted in said slot and adapted to engage a crank pin, blocks having dowel pins projecting therefrom and secured to the outer face of said brasses by said dowel pins, shims positioned between said blocks and brasses and retained in place by means of said dowel pins, said blocks each having a convex cylindrical surface, and saddles mounted in the slot and each having a cooperating concave cylindric surface to receive a convex surface of one of said blocks.

7. A connecting rod having a slotted end provided with a passage extending from said slot, a bearing member movably mounted in said slot, a wedge-shaped member mounted in said slot and movable at an angle to said bearing member, a wedge-shaped block mounted in said passage and movable at an angle to said wedge-shaped member, a spring disposed in said passage and acting between said block and the walls of said passage, and means adjustably carried by said block for regulating the pressure of said spring against said block, thereby to urge said block into engagement with said wedge-shaped member.

8. A connecting rod having a slotted end provided with a passage extending from said slot, a bearing member movably mounted in said slot, a wedge-shaped member mounted in said slot and movable at an angle to said bearing member, a wedge-shaped block mounted in said passage and movable at an angle to said wedge-shaped member, said block being provided with a threaded rod and a nut adjustable thereon, and a spring disposed about said rod and between said nut and the walls of said passage.

VICTOR E. ANKARLO.